Oct. 26, 1965 C. A. BALLARD 3,214,731

VEHICLE BACK-UP ALARM DEVICE

Filed April 19, 1963

INVENTOR.
CLARK A. BALLARD
BY *Angus & Mon*
ATTORNEYS.

United States Patent Office 3,214,731
Patented Oct. 26, 1965

3,214,731
VEHICLE BACK-UP ALARM DEVICE
Clark A. Ballard, 3057 Ceylon Road, Costa Mesa, Calif.
Filed Apr. 19, 1963, Ser. No. 274,199
11 Claims. (Cl. 340—70)

This application relates to a warning device.

There are many fields in which warning devices are required to give a signal such as a flashing light or an intermittent sound whenever a mechanism operates. A specific example of such an application is found in the construction industry, wherein heavy duty equipment on a construction site is required to carry a warning device which will make some positive indication, independent of operator actuation, whenever the equipment backs up. This would give a positive warning to nearby persons should the brakes slip. Many States have passed industrial safety orders compelling the use of these devices. In some such States, should they not be provided, their absence constitutes negligence per se on the part of the owner of the vehicle in the event of accident, and subjects him to absolute liability. It follows that it is only good economic sense to provide such warning devices on vehicles used on construction sites.

As is to be expected, in response to such a definite requirement for a product, some products have been provided for this purpose. However, they have one failing in common, and that is that they ordinarily require that the signal to operate the alarm be given at some position of the wheel, and intermittently when the wheel passes this position. In the known devices, this means that should the wheel or other element stop at some given angular position, then the alarm continues to sound, and this is a source of very great annoyance on the construction site. Accordingly, these devices have frequently been provided with shut-off switches, which of course defeats the entire purpose of the device because then the switch might be left in a shut-off position and the device back up and injure somebody without warning.

Accordingly, it is an object of this invention to provide a warning device wherein the device will give a periodic warning, but which cannot shut off, the signal of which cannot keep in operation, regardless of the position in which the mechanism stops. This enables this device to be utilized without annoyance on trucks, presses, and any type of apparatus in which relatively movable parts are used and wherein a warning is desired should they begin to move relative to each other.

A warning device according to this invention includes a drive shaft which operates with a portion of a mechanism whose relative movement is to be detected, and a driven shaft driven by the drive shaft. A unidirectional limiting means is interposed between the drive and driven shafts in order that the driven shaft may operate in one direction only.

This device includes a capacitor, one side of which is connected to a source of potential, and the other side of which is connected to a selector means, the selector means operating as a function of the operation of the driven shaft. The selector means selectively switches the other side of the capacitor between ground and an alarm to be sounded. Thus, the alarm can be actuated by condenser discharge which, when once discharged, cannot reactuate the alarm until after another cycle has been gone through which includes grounding and subsequent connection to the alarm.

According to a preferred but optical feature of the invention, relay means is provided to enable relatively small capacitor discharge to actuate an alarm which requires a somewhat greater current for its actuation.

The above and other features of this invention will be fully understood from the following detailed description and the accompanying drawings in which.

Figure 1:
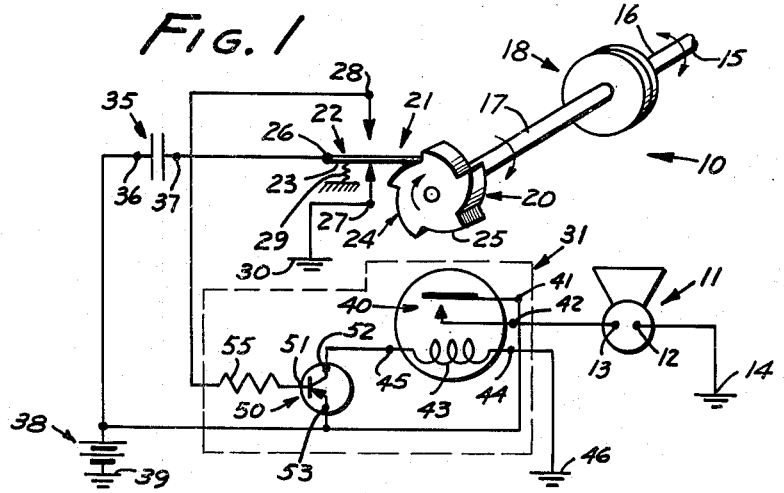
FIG. 1 is a schematic and diagrammatic illustration of the presently preferred embodiment of the invention.

The presently preferred embodiment of an alarm device 10 according to the invention is shown in FIG. 1. The objective of this device is periodically to actuate an alarm 11 such as a horn. It will be understood that this alarm could be any other type of audible device, such as a bell or gong, or might be a visible indicator such as a light. The nature of the alarm is immaterial to this invention, except that it should be electrically actuable. The alarm has a first and second terminal 12, 13, respectively, the first terminal being connected to ground 14.

The alarm is to be actuated when one portion of some mechanism moves relatively to another portion of it. Such relative motion might occur between rolls of a printing press, an automobile axle, or as illustrated, a speedometer cable 15 to which a drive shaft 16 is connected. The drive shaft is intended to turn a driven shaft 17.

Unidirectional limiting means 18 is provided between the drive and driven shafts and connects them so that the drive shaft may turn the driven shaft in only one dirction. The unidirectional limiting means may be a roller clutch, or like device. The nature of the unidirectional limiting means is immaterial to the invention, except that when the device is to be mounted in connection with the speedometer cable, preferably just next to the speedometer, it is convenient for the device to be a clutch, because it is small. A roller clutch is therefore the presently preferred embodiment, the constructional details of which are unnecessary to the effective disclosure of the invention.

An actuator means 20 is connected to, and driven by, the driven shaft for the purpose of actuating selector means 21. The selector means in the preferred embodiment comprises a single-pole double-throw switch 22 having a switch blade 23, which acts both as a contactor and as a pawl for a ratchet surface 24 on the actuator means. The cam surfaces 25 cause the switch blade to switch between two of its terminals. Switch 22 includes first, second and third terminals 26, 27, 28. The switch blade being biased by spring 29 toward second terminal 27, cam surfaces 25 tending to lift the blade up to make contact with third terminal 28. Thus, the actuator means serves to alternate the switch blade between contact with the second and third terminals 27 and 28, thereby alternately to connect them to first terminal 26. Second terminal 27 is connected to ground 30. Third terminal 28 is connected to the alarm through relay means 31.

A capacitor 35 has first and second terminals 36, 37. The first terminal 36 is connected to a voltage source 38, the other side of which is grounded at 39. Second terminal 37 is connected to first terminal 26 of the selector means so that alternation of the swtich blade between the second and third terminals 27 and 28 alternately charges the capacitor relative to ground, and discharges it to the relay means.

Relay means 31 includes a relay switch 40 which has first and second terminals 41 and 42. The first terminal is connected to the voltage source, and the second terminal is connected to the second terminal 13 of the alarm. The relay switch is normally open, and is closed by energizing coil 43, which coil has first and second terminals 44, 45. First terminal 44 of the coil is grounded at 46. All grounds are at the same voltage level in this system.

A transistor 50 has first, second and third terminals 51, 52, 53 which are connected respectively to the base, collector, and emitter, respectively. The second terminal of the transistor is connected to the second terminal of the coil, and the third terminal 53 is connected to voltage source 38.

A resistor 55 is connected to the third terminal of the selector means and to the first terminal of the transistor. It will be noted that the capacitor and resistor have a time constant which determines the rate and shape of the discharge which passes to the transistor base, and the values will be selected appropriately.

Figure 2:
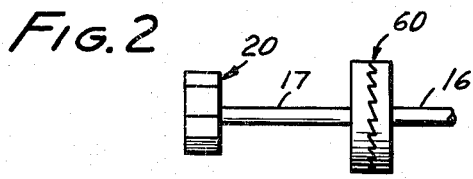
FIG. 2 shows an alternate embodiment of a portion of FIG. 1.

FIG. 2 illustrates a ratchet clutch 60, on the order of a Bendix type device, which may be used in place of the schematically illustrated unidirection limiting means 18 in FIG. 1. Other corresponding numbers are the same.

Figure 3:
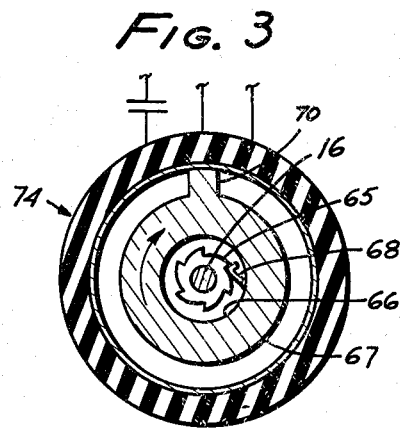
FIG. 3 is an end view of an alternate embodiment of another portion of the device of FIG. 1.
Figure 4:
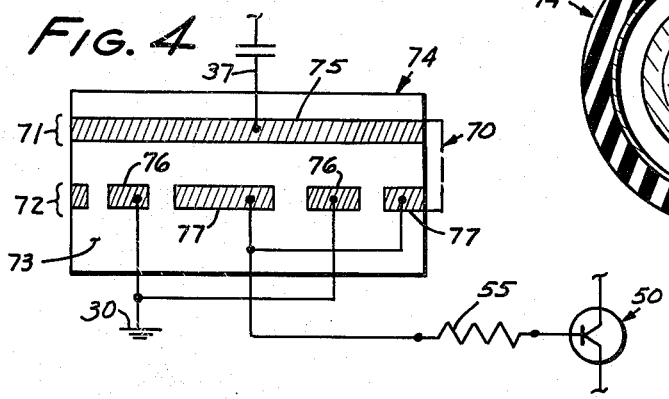
FIG. 4 is a developed surface of a portion of FIG. 3.
Figure 5:
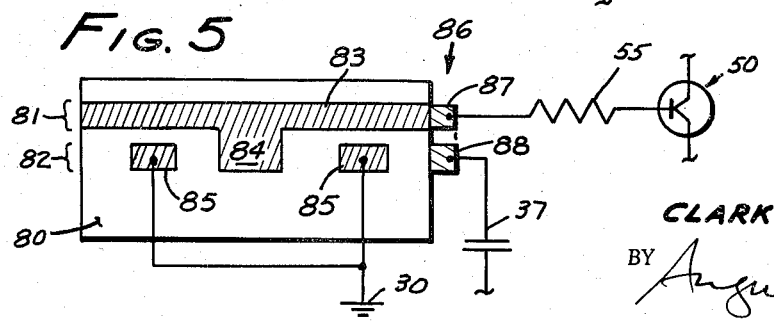
FIG. 5 is a developed surface similar in nature to that of FIG. 4 relating to another embodiment of the invention.

The selector means in FIG. 1 comprises a switch which may be alternated between two switching conditions. This is only one form of selector means useful for making alternate connections to ground and to the alarm. FIGS. 3–5 illustrate other types of selector means. For example, in FIG. 3 there is shown drive shaft 16 carrying a ratchet gear 65 within a passage 66 in a rotor 67. The rotor may be rotationally mounted by bearings not shown. A pawl 68 is mounted to the inside wall of the passage and engages the ratchet gear so that the rotor can be driven in only one direction, the rotor thereby being the driven shaft in this embodiment.

The rotor carries a follower 70, which is also shown in FIG. 4. It bridges two paths 71, 72 on the inside surface 73 of an insulating stator 74 which may be mounted to the speedometer body. The shaded areas in FIG. 4 illustrate conductive bands. Band 75 is a continuous peripheral band, and path 72 has discontinuous conductive portions 76, 77, the two outer end portions being continuous and connected to each other when the surfaces are wrapped in the configuration of FIG. 3. Portions 76 and 77 are insulated from each other and from band 75.

Band 75 is connected to the second terminal of the capacitor. Portions 76 are connected to ground 30. Portion 77 is connected to the alarm through the relay means. It will be seen that relative rotation between the rotor and the stator causes the conductive follower to bridge and interconnect band 75 alternately with portions 76 and 77, thereby accomplishing the same switching techniques as shown in FIG. 1. This device may be directly substituted for the selector means in FIG. 1.

FIG. 5 shows another embodiment similar in concept to that of FIG. 4, wherein an inner surface 80 is shown having paths 81, 82, there being a band 83 with a conductive portion 84 lying in both paths. Conductive portions 85 are connected to each other and spaced from portion 84 in path 82. A follower 86 in this device comprises a pair of conductive wipers 87, 88 insulated from each other, and following paths 81 and 82, respectively. Portions 85 are connected to ground 30. Wiper 87 is connected to the alarm through the relay means, and wiper 88 is connected to the second terminal of the capacitor.

Suitable valves for the components of the circuit are as follows:

Capacitor 35: 250 mfd., 15 v. d.c.
Transistor 50: RCA 2N301A (PNP)
Resistor 54: Ohmite 160 ohm, ½ w.
Voltage source 38: 12 volts.
Switch 40 and coil 43: AMPCO relay LR620 coil, 60 ohm included.
Alarm: Jubilee #22, 12-volt horn, or 12-volt lamp.

The operation of the device should be evident from the foregoing. Assuming the device to be at rest in the condition illustrated in FIG. 1, the capacitor is grounded and will charge up to its capacity. Then, when the driven shaft is turned, the cam surfaces will move the switch blade up to contact the third terminal of the switch and connect the condenser so as to discharge to the alarm through the relay. This current appropriately biases the base of the transistor so as to make the transistor conductive, thereby providing for an amplified current to energize coil 43 and close switch 40 to actuate the alarm. This actuation will continue so long as the condenser is discharging, but once the condenser is discharged, there will be no further actuation of the alarm because there is nothing to cause the relay means to be actuated. Therefore, even though the mechanism or vehicle might stop in such a position that the switch blade would be held against the third terminal of the selector means, still the alarm could not continue to sound. Further rotation of the driven shaft will cause the switch blade to return to the position shown in FIG. 2. Some overtravel of the switch blade ordinarily being provided for so that ample time for charging is obtainable, at which time the condenser again charges and the cycle may repeat itself.

It will be observed that the condenser discharge is connected to the alarm, but in this case through the relay means. Should a strong enough discharge be available, it would have been suitable, of course, to actuate the alarm directly from the capacitor, but this ordinarily would not be a commercially desirable embodiment.

FIG. 2 merely shows that there are numerous embodiments of unidirectional clutches suitable for this purpose wherein only a back-up signal is desired. The arrangement wherein a bidirectional signal is desired would be rare, but in that event it could be supplied by obvious revision of the cams, and by deleting the unidirectional limiting means, so that the signal would sound whichever direction the mechanism were operated.

In FIG. 4 the same switching operation takes place as already described, except that it is caused by the bridging of the two paths by follower 70 which alternately interconnects band 75 with portion 76 thereby to ground the capacitor, and next connecting band 75 to portion 77 discharging the condenser to the relay means.

The operation of FIG. 5 is similar, except that when wiper 88 is in contact with grounded portions 85 the capacitor is being charged, and when wipers 87 and 88 are both connected to band 83 and portions 84, discharge of the condenser is accomplished.

It will be seen that this is an inexpensive, reliable and rugged construction, suitable for use on any device in which relative motion of one part relative to another is to be detected. If finds its principal utility in back-up devices where no cutoff is provided, because one would not wish to run the risk of having the device cut off at a time when it ought to be actuated merely to avoid its sounding when the machine moves in a regular direction.

This invention is not to be limited by the embodiments shown in the drawings and described in the description which are given by way of example and not of limitation, but only in accordance with the scope of the appended claims.

I claim:
1. A warning device for indicating motion of a mechanism, comprising: a drive shaft adapted to be mounted to an element rotated by a moving mechanism; a driven shaft; unidirectional limiting means joining the drive and driven shaft and enabling the drive shaft to turn the driven shaft in only one direction; a capacitor having a first and a second terminal, the first terminal being adapted to be connected to a voltage source; an electrically actuable alarm having a first and a second terminal, its first terminal being adapted to be connected to ground; a selector means having a first terminal connected to the second terminal of the capacitor, and a second and third terminal, the second terminal being adapted to be con- nected to ground, and the third terminal being connected to the second terminal of the alarm; and actuator means connected to and driven by the driven shaft for alternately interconnecting the second and third terminals of the selector means to its first terminal thereby alternately to ground and charge the capacitor, and then to discharge it to operate the alarm.

2. A warning device according to claim 1 in which a relay is interposed between the third terminal of the selector means and the second terminal of the alarm, said relay being so disposed and arranged as to be operated by capacitor discharge, and to be connected to a power source thereby to supply power to operate the alarm greater than that derivable from the capacitor.

3. A warning device according to claim 2 in which the relay comprises a switch, a coil so disposed and arranged as to actuate the switch, said switch being connected to the second terminal of the alarm, and adapted to be connected to the power source, the coil having two terminals, a first adapted to be connected to ground, and in which the relay further includes current control means having three terminals, the first connected to the third terminal of the selector means, the second connected to the second terminal of the coil, and the third adapted to be connected to the power source, whereby discharge of the condenser enables current to pass through the current control means to actuate the coil and thereby close the relay switch to operate the alarm.

4. A warning device according to claim 3 in which the current control means comprises a transistor, its first terminal being the base, and its other two terminals being the collector and emitter, and in which a resistor is connected between the third terminal of the selector means and the first terminal of the current control means.

5. A warning device according to claim 1 in which the selector means includes a switch blade in constant connection with the first terminal, and in which the unidirectional limiting means includes a ratchet, the switch blade acting as a pawl, and the ratchet acting as means to move the switch blade between the second and third terminals.

6. A warning device according to claim 1 in which the unidirectional limiting means is a one-way clutch.

7. A warning device according to claim 1 in which the selector means and the actuator means are concentric elements, one inside the other, and one is rotatable relative to the other, a surface on one of said elements carrying a conductive band in a first peripheral path connected to the first terminal of the capacitor, the other element carrying a plurality of conductive band portions in a second peripheral path, one portion connected to the third selector means terminal, and the other being adapted to be connected to ground, a member on the other element bridging the bands.

8. A warning device according to claim 1 in which the selector means and the actuator means are concentric elements, one inside the other, and one is rotatable relative to the other, a surface on one of said elements carrying a conductive band lying continuously in a first, and interruptably in a second of two peripheral paths, and a plurality of conductive band portions lying in the second of said bands, the other element including a contactor following the first path and connected to the third terminal of the selector means, and another contactor following the second path and connected to the first terminal of the selector means, the portion of the second band not common to the first band being connected to the second terminal of the selector means.

9. In combination: a speedometer cable and a warning device for indicating rotation thereof in one direction, said warning device comprising a drive shaft adapted to be mounted to the speedometer cable; a driven shaft; unidirectional limiting means joining the drive and driven shaft and enabling the drive shaft to turn the driven shaft in only one direction; a capacitor having a first and a second terminal, the first terminal being adapted to be connected to a voltage source; an electrically actuable alarm having a first and a second terminal, its first terminal being adapted to be connected to ground; a selector means having a first terminal connected to the second terminal of the capacitor, and a second and third terminal, the second terminal being adapted to be connected to ground, and the third terminal being connected to the second terminal of the alarm; and actuator means connected to and driven by the driven shaft for alternately interconnecting the second and third terminals of the selector means to its first terminal thereby alternately to ground and charge the capacitor, and then to discharge it to operate the alarm.

10. A warning device according to claim 9 in which a relay is interposed between the third terminal of the selector means and the second terminal of the alarm, said relay being so disposed and arranged as to be operated by capacitor discharge, and to be connected to a power source thereby to supply power to operate the alarm greater than that derivable from the capacitor.

11. A warning device according to claim 10 in which the relay comprises a switch, a coil so disposed and arranged as to actuate the switch, said switch being connected to the second terminal of the alarm, and adapted to be connected to the power source, the coil having two terminals, a first adapted to be connected to ground, and in which the relay further includes current control means having three terminals, the first connected to the third terminal of the selector means, the second connected to the second terminal of the coil, and the third adapted to be connected to the power source, whereby discharge of the condenser enables current to pass through the current control means to actuate the coil and thereby close the relay switch to operate the alarm.

No references cited.

NEIL C. READ, *Primary Examiner.*